United States Patent
Farrell et al.

(10) Patent No.: US 10,414,406 B2
(45) Date of Patent: Sep. 17, 2019

(54) MEASURING DRIVING VARIABILITY UNDER POTENTIALLY DISTRACTING CONDITIONS

(71) Applicant: International Business Machines Corporation, Armonk, NY (US)

(72) Inventors: Robert G. Farrell, Cornwall, NY (US); Jonathan Lenchner, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 15/057,143

(22) Filed: Mar. 1, 2016

(65) Prior Publication Data
US 2017/0253251 A1    Sep. 7, 2017

(51) Int. Cl.
*B60W 40/09* (2012.01)
(52) U.S. Cl.
CPC .................. *B60W 40/09* (2013.01)
(58) Field of Classification Search
None
See application file for complete search history.

(56) References Cited

U.S. PATENT DOCUMENTS

| | | | |
|---|---|---|---|
| 5,797,134 A | 8/1998 | McMillan et al. | |
| 6,282,968 B1 * | 9/2001 | Sano | B62D 15/022 73/117.02 |
| 8,060,150 B2 | 11/2011 | Mendenhall et al. | |
| 8,731,530 B1 | 5/2014 | Breed et al. | |
| 8,971,927 B2 | 3/2015 | Zhou et al. | |
| 2002/0151297 A1 * | 10/2002 | Remboski | B60R 16/0231 455/414.1 |

(Continued)

FOREIGN PATENT DOCUMENTS

| | | |
|---|---|---|
| GB | 2488956 A | 12/2012 |
| WO | 2014137711 A1 | 9/2014 |

OTHER PUBLICATIONS

Ahlstrom et al., "Measuring Driver Impairments", IEEE Pulse, Mar./Apr. 2012, 9 pages, <http://ieeexplore.ieee.org/ielx5/5454060/6173090/06173094.pdf?tp=&arnumber=6173094&isnumber=6173090>.

(Continued)

*Primary Examiner* — Jonathan M Dager
*Assistant Examiner* — Garrett F Evans
(74) *Attorney, Agent, or Firm* — Steven F. McDaniel; Arnold B. Bangali

(57) ABSTRACT

A method, executed by a computer, includes receiving movement data and distracting conditions data corresponding to one or more driving sessions for a user and identifying a potentially distracting condition for the user encountered during the one or more driving sessions. The method also includes determining one or more distraction-free intervals and one or more distraction-present intervals corresponding to driving during the one or more driving sessions. The method also includes comparing movement data corresponding to the one or more distraction-free intervals with movement data corresponding to the one or more distraction-present intervals to produce distraction effect information. A computer system and computer program product corresponding to the method are also disclosed herein.

20 Claims, 6 Drawing Sheets

(56) References Cited

U.S. PATENT DOCUMENTS

| | | | |
|---|---|---|---|
| 2010/0241021 A1* | 9/2010 | Morikawa | A61B 5/048 600/544 |
| 2011/0077028 A1 | 3/2011 | Wilkes, III et al. | |
| 2012/0053805 A1 | 3/2012 | Dantu | |
| 2012/0197669 A1 | 8/2012 | Kote et al. | |
| 2014/0278574 A1 | 9/2014 | Barber | |
| 2016/0362118 A1* | 12/2016 | Mollicone | B60W 40/09 |

OTHER PUBLICATIONS

Bo et al, "TEXIVE: Detecting Drivers Using Personal Smart Phones by Leveraging Inertial Sensors", printed on Dec. 17, 2015, 13 pages.

Drews et al., "Passenger and Cell-Phone Conversations in Simulated Driving", Proceedings of the Human Factors and Ergonomics Society 48th Annual Meeting—2004, 3 pages.

Eren et al., "Estimating Driving Behavior by a Smartphone*", 2012 Intelligent Vehicles Symposium Alcala de Henares, Spain, Jun. 3-7, 2012, © 2012 IEEE, 6 pages.

Johnson et al., "Driving Style Recognition Using a Smartphone as a Sensor Platform", 2011 14th International IEEE Conference on Intelligent Transportation Systems, Washington, DC, USA. Oct. 5-7, 2011, © 2011, IEEE, 8 pages.

Mell et al., "The NIST Definition of Cloud Computing", NIST National Institute of Standards and Technology, US. Department of Commerce, Special Publication 800-145, Sep. 2011, 7 pages.

"Apple tech takes on distracted driving, blocks users from texting while behind the wheel", printed on Dec. 17, 2015, 9 pages, <http://appleinsider.com/articles/14/04/22/apple-tech-takes-on-distracted-driving-blocks-users-from-texting-while-behind-the-wheel>.

"Distracted Driving Raises Crash Risk", NIH News in Health, Feb. 2014, 1 pages, <https://newsinhealth.nih.gov/issue/feb2014/capsule1>.

"Talking on cell phone not as dangerous as dialing or texting while driving: study", The Associated Press, Jan. 2, 2014, 5 pages, <http://www.nydailynews.com/autos/car-crash-risks-aplified-dialing-texting-reaching-cell-phone-article-1.1564313>.

"Think before you speak", The Economist, Apr. 14, 2011, Los Angeles, 4 pages, <http://www.economist.com/node/18561075?story_id=18561075>.

* cited by examiner

MEASURING DRIVING VARIABILITY UNDER POTENTIALLY DISTRACTING CONDITIONS

BACKGROUND OF THE INVENTION

The present invention relates generally to the field of safety, and more particularly to measuring driving behavior.

Many individuals have become accustomed to using their mobile phones, or other electronic devices, while driving in their cars or operating other equipment. Despite laws and warnings against such practices, as well as numerous studies indicating the debilitating effects of distracted driving, many drivers continue to use electronic devices while driving.

SUMMARY

As disclosed herein, a method, executed by a computer, includes receiving movement data and distracting conditions data corresponding to one or more driving sessions for a user and identifying a potentially distracting condition for the user encountered during the one or more driving sessions. The method also includes determining one or more distraction-free intervals and one or more distraction-present intervals corresponding to driving during the one or more driving sessions. The method also includes comparing movement data corresponding to the one or more distraction-free intervals with movement data corresponding to the one or more distraction-present intervals to produce distraction effect information. A computer system and computer program product corresponding to the method are also disclosed herein.

DETAILED DESCRIPTION

The embodiments disclosed herein recognize a need for drivers (as well as other associated parties) to understand the actual effect of distracting conditions on their particular driving patterns. The embodiments disclosed herein also recognize that providing valid data on the effect of distracting conditions requires collecting data on driving patterns both with, and without, the presence of the distracting conditions.

Figure 1:
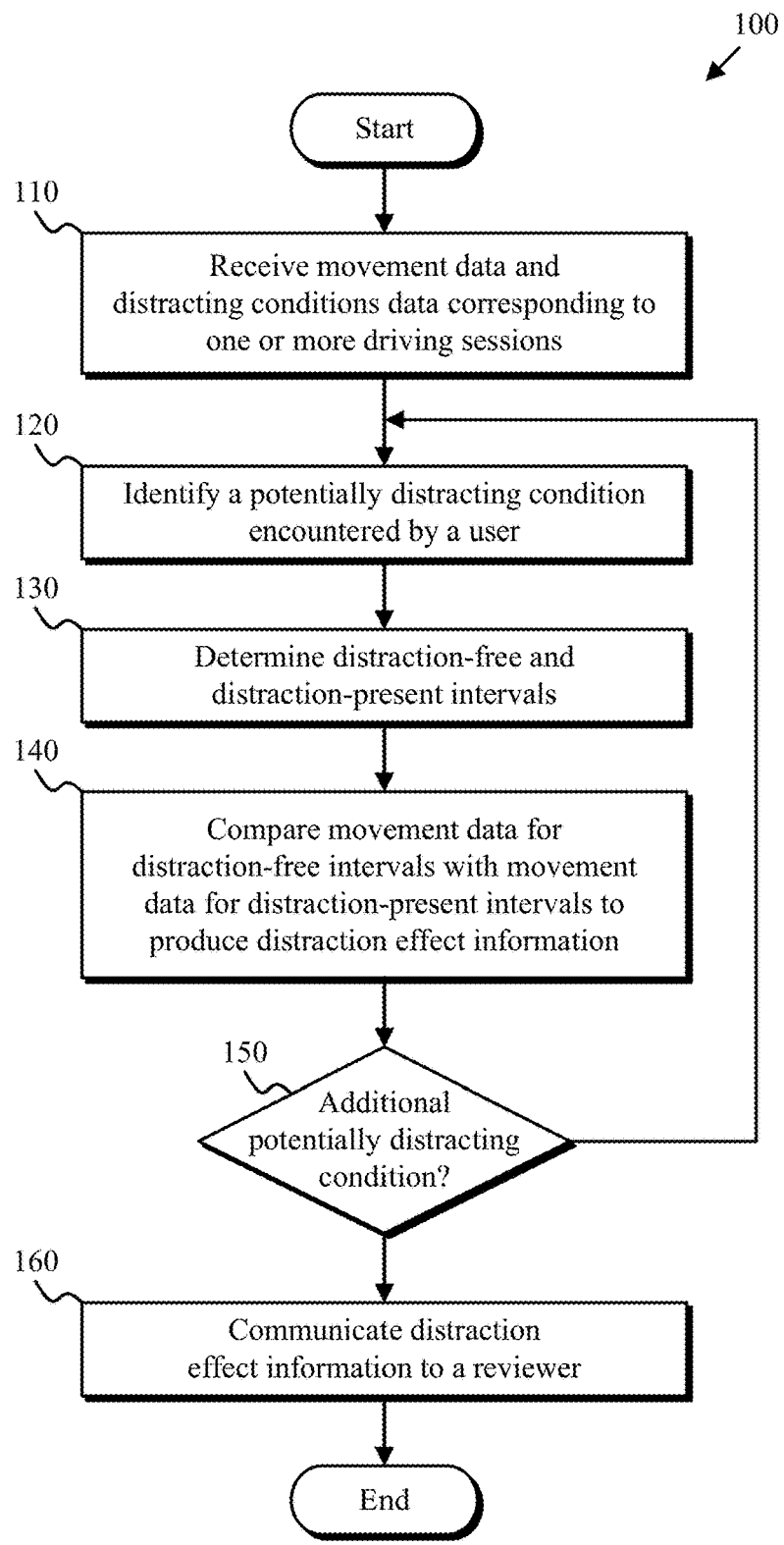
FIG. 1 is a flowchart depicting one example of a distraction effect determination method in accordance with at least one embodiment of the present invention.

Various embodiments will now be described in reference to the Figures. FIG. 1 is a flowchart depicting one example of a distraction effect determination method 100 in accordance with at least one embodiment of the present invention. As depicted, the distraction effect determination method 100 includes receiving (110) driving data, identifying (120) a potentially distracting condition, determining (130) distraction-free and distraction-present intervals, comparing (140) movement data for the distraction-free and distraction-present intervals to produce distraction effect information, determining (150) whether additional potentially distracting conditions exist, and communicating (160) the distraction effect information to a reviewer. The distraction effect determination method 100 enables determination of the effects of various distractions on the driving patterns of a driver. The distraction effect determination method 100 may be conducted by a user's electronic device, a subsystem of a vehicle, or a remote computer such as a server.

Receiving (110) driving data may include receiving movement data and distracting conditions data for one or more driving sessions. The movement data may describe or capture lateral movements, or the like, of a vehicle operated by a user. For example, the movement data be position, velocity, or acceleration data relative to the travel path (e.g., current velocity vector) of the vehicle. The data may be absolute data or relative data normalized to a route along which a vehicle is traveling. The movement data may be collected from one or more sensors associated with a vehicle, or an electronic device such as a mobile phone that is proximate to, or within, the vehicle during the driving sessions. In some embodiments, the movement data is metadata about the movement of the vehicle. In one particular embodiment, the movement data comprises rotational data or metadata provided by, or derived from, a sensor mounted on a steering wheel, or other steering component, of the vehicle operated by the user.

The distracting conditions data may indicate the presence or relative intensity of one or more potentially distracting conditions encountered by the user during the driving sessions. The potentially distracting conditions may include: activity-based conditions, traffic conditions, environmental conditions, and the like. Examples of activity-based conditions include whether, or how actively, a user is using an electronic device, listening to a audio book, conducting a conversation with a passenger, talking on a mobile phone with a remote party, and looking away from the road. Examples of traffic conditions include traffic speed, stopping frequency, and traffic density. Examples of environmental conditions include weather conditions (e.g., driving in the rain or snow), lighting conditions (e.g., driving into the sun, driving in the early morning, driving late at night), road conditions (e.g., wet or icy), interior sound conditions, and exterior sound conditions. The distracting conditions data may be collected from sensors or subsystems associated with the vehicle, a user's electronic device such as a mobile phone, or external sources such as weather and traffic websites.

Identifying (120) a potentially distracting condition may include identifying a particular distracting condition indicated by the distracting conditions data. For example, "conversing on a mobile phone" may be indicated at various points in time within the distracting conditions data collected during one or more driving sessions.

Determining (130) distraction-free and distraction-present intervals may include determining starting times or locations as well as ending times or locations for the particular distracting condition. For example, a user may travel between mile marker 96 and mile marker 119 along a particular road and use a mobile phone to converse with a remote party between mile markers 103 and 110. In the above example, the distraction-free intervals would be marker 96 to marker 103 and marker 110 to marker 119 while the distraction-present interval would be marker 103 to marker 110.

The distraction-free and distraction-present intervals may be selected to be as similar as possible. For example, intervals from multiple driving sessions over the same route may be selected that occur during a similar time of day, during similar traffic conditions and environmental conditions. Consequently, the distraction-free and distraction-present intervals may have substantially identical conditions except for the particular distraction condition (as identified in step 120) that is being analyzed.

Comparing (140) movement data may include comparing movement data or metadata for the distraction-free and distraction-present intervals to produce distraction effect information. For example, statistical information such as the variance or variability in movement data for the distraction-free and distraction-present intervals may be compared. In some embodiments, instances of sharp lateral movements (e.g., instances where lateral velocities are 2-3 standard deviations beyond the average or median lateral velocity) as well as instances of sudden braking are detected from the movement data. For example, filters may be used on the movement data to determine the amount of lateral movement and forward braking that occurs. One or more thresholds may be selected to enable identification of sharp lateral movements and sudden braking. [Note: One of skill in the art will appreciate that in certain embodiments, sharp or sudden movements can be distinguished from sensor noise in that non-noisy acceleration data will integrate to give velocity and distance data that is consistent with GPS data provided by a vehicle subsystem or a user's electronic device (or analogous data obtained through a vehicles odometer).]

Instances of lateral movement and forward braking that exceed a selected threshold may be marked. The number and severity of marked instances may be compared. In some embodiments, the filtering, thresholding and marking of movement data is done in real-time or near real-time (previous to invocation of the method 100) so that only movement metadata is collected (e.g., specific instances of sharp lateral movement and sudden forward braking) and saved for later analysis (e.g., by the method 100). Collecting and processing only metadata may significantly reduce the amount of data processed by the method 100.

Determining (150) whether additional potentially distracting conditions exist may include determining whether another distraction condition occurred during the driving sessions. If another distraction condition occurred, the method loops to step 120. If another distraction condition did not occur the method advances by communicating (160) the distraction effect information.

Communicating (160) the distraction effect information may include presenting or transmitting the distraction effect information to a reviewer. The reviewer may be the user (i.e., driver) or another interested party such as a parent, supervisor, or insurance company. In certain embodiments, the distraction effect information is presented at least to the user via the user's electronic device. In some embodiments, the urgency of the communication (e.g., indicated in a message, a message header, or some other message field or flag) corresponds to the severity of the distraction effects. In certain embodiments, the distraction effect information is compared with such information from other users or populations of users.

Figure 2:
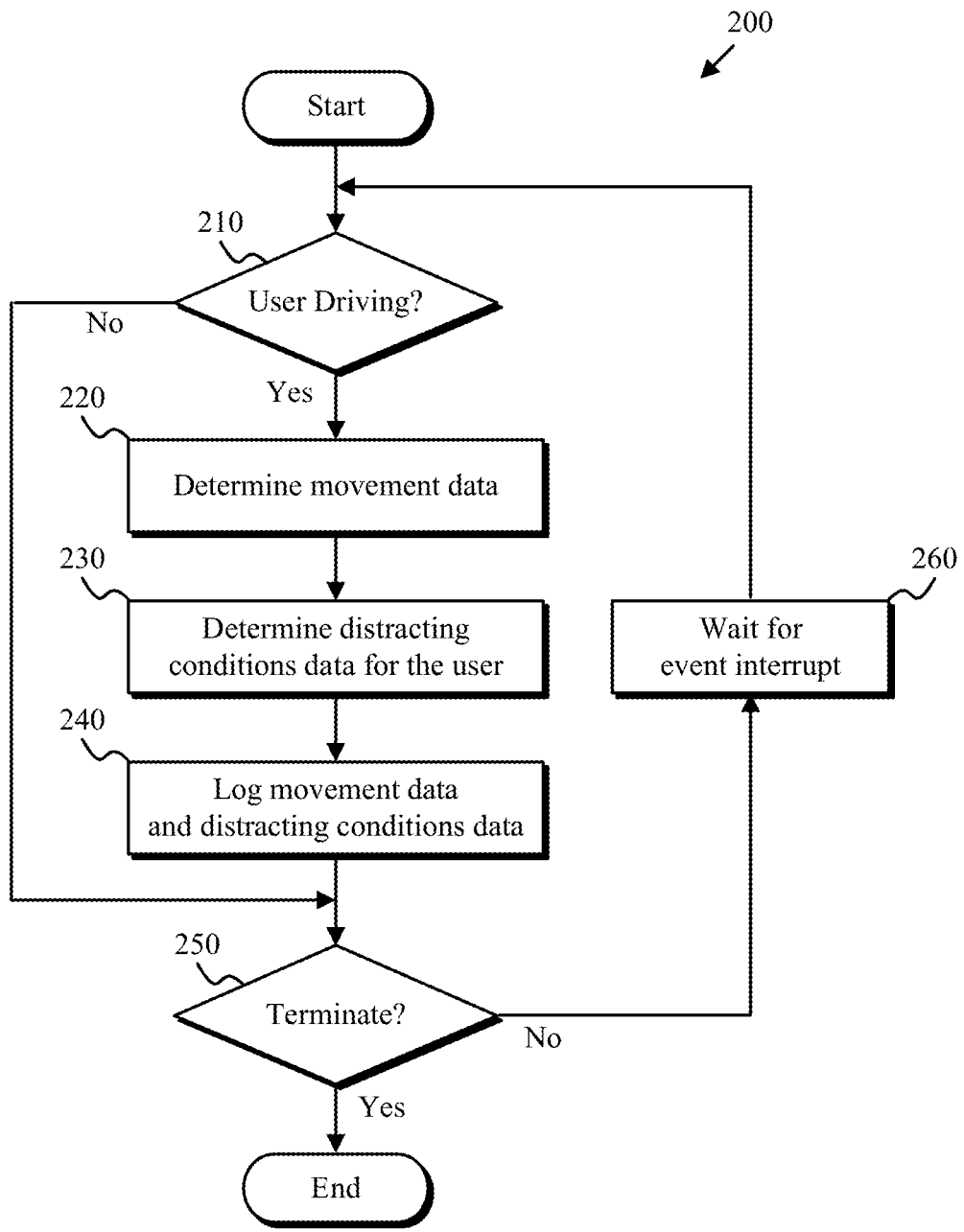
FIG. 2 is a flowchart depicting one example of a driving data logging method in accordance with at least one embodiment of the present invention.

FIG. 2 is a flowchart depicting one example of a driving data logging method 200 in accordance with at least one embodiment of the present invention. As depicted, the driving data logging method 200 includes determining (210) whether a user is driving, determining (220) movement data, determining (230) distracting conditions data, logging (240) the movement data and distracting conditions data, determining (250) whether to terminate, and waiting (260) for an event interrupt. The driving data logging method 200 may capture movement data and distracting conditions data or metadata that is used by the distraction effect determination method 100. The driving data logging method 200 may be conducted by a user's electronic device or a subsystem of a vehicle. In some embodiments, the driving data logging method 200 is associated with one or more device drivers or system utilities that have low-level access to one or more sensors. In certain embodiments, the driving data logging method 200 is event driven.

Determining (210) whether a user is driving may include determining whether a vehicle is moving and whether the user or the user's electronic device is proximate to the driving position of the vehicle. For example, a positioning signal or communication signal such as a Bluetooth® signal provided by the vehicle may be used to determine the position of the user's electronic device within the vehicle. Facial recognition of an image provided by a camera placed within the vehicle may also be used to determine the particular user that is driving.

Alternately, the user may explicitly indicate via verbal or tactile input, to an electronic device or a vehicle subsystem, that he or she is about to drive a vehicle. In some embodiments, the user's electronic device or a vehicle subsystem detects a wireless connection to a vehicle by the user's electronic device and prompts the user for a verbal response with one or more questions such as "Is this Robert? . . . Are you driving to the office?". The response(s) to the prompt(s) may be leveraged to determine the identity of the driver (e.g., via a voiceprint) as well as clues to the driving destination.

Determining (220) movement data may include accessing an accelerometer or some other sensor that indicates the velocity, acceleration, or position of the vehicle. One of skill in the art will appreciate that integrating or differentiating operations may be used to convert between velocity, acceleration, and position. Alternately, vehicular sensors, such as sensors in the vehicle's odometry system, may be accessed to estimate movement of the vehicle.

Determining (230) distracting conditions data may include accessing sensors or other sources of information on the current distracting conditions. Examples of distracting conditions data include the various types and sources of data described in conjunction with the receiving operation 110 of FIG. 1.

Logging (240) the movement data and distracting conditions data may include saving the movement data and distractions data to a memory. In some embodiments, only significant changes in the movement data and distracting conditions data are recorded. Consequently, during some iterations the logging operation 240 may be skipped. In certain embodiments, metadata for significant changes is stored rather than the actual data.

Determining (250) whether to terminate may include determining if a kill signal or some other semaphore has been sent to a process corresponding to the method 200. If no such signal or semaphore has been received, the depicted method 200 continues by waiting (260) for an event interrupt. Waiting (260) for an event interrupt may include setting a timer interrupt and/or sleeping the process corresponding to the method 200. Once the event interrupt is received, the depicted method 200 loops to step 210 and continues.

Figure 3:
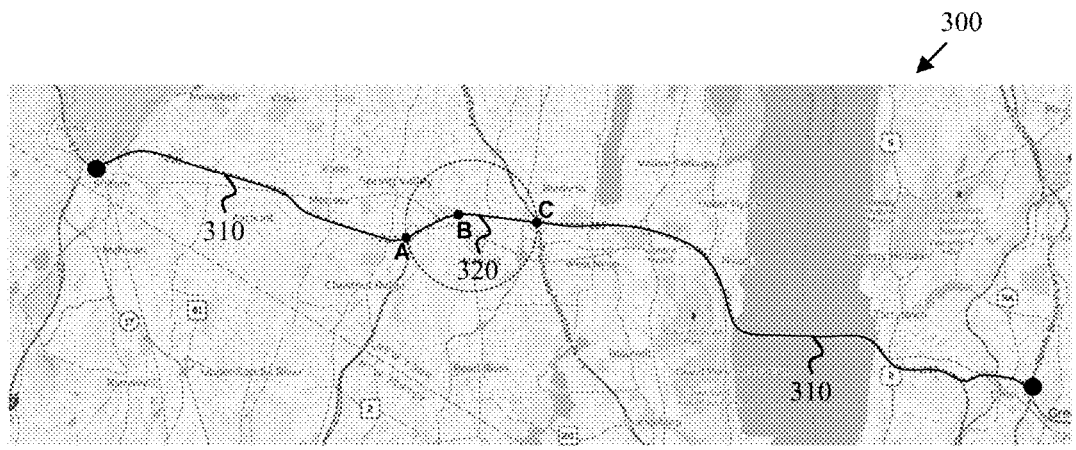
FIG. 3 is a map depicting one example of a route map in accordance with at least one embodiment of the present invention.

FIG. 3 is a map depicting one example of a route map 300 in accordance with at least one embodiment of the present invention. The route map 300 shows a habitually traveled route 310 that includes various legs or segments such as a highlighted segment 320. The highlighted segment 320 begins at map marker 'A', passes through map marker 'B', and ends at map marker 'C'.

Figure 4:
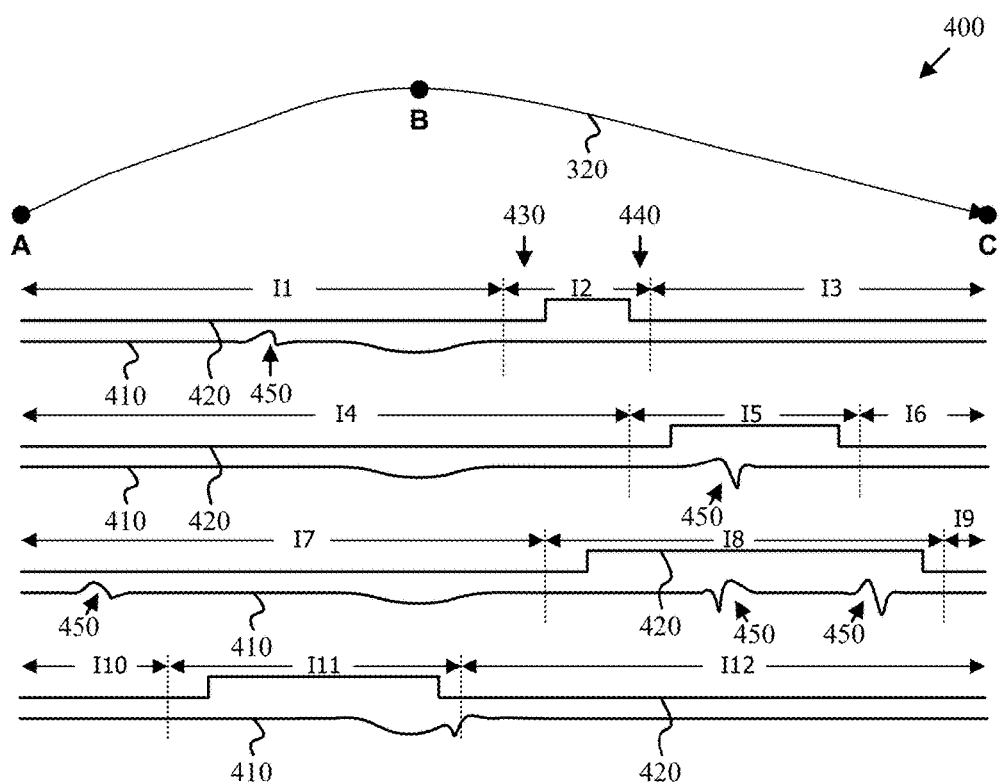
FIG. 4 is graph depicting one example of movement data in accordance with at least one embodiment of the present invention.

FIG. 4 is graph 400 depicting one example of movement data 410 and corresponding data 420 for a distracting condition. Each instance of the movement data 410 and data 420 for a distracting condition corresponding to driving over the route segment 320. As depicted, the movement data 410 corresponds to the lateral velocity or steering wheel rotation angle of a vehicle being driven by a user. Positive (upward) deviations in the movement data 410 correspond to turning to the left relative to the current trajectory (velocity vector) of the vehicle and negative deviations correspond to turning to the right relative to the current trajectory (velocity vector) of the vehicle.

The corresponding data 420 may be provided by the user's electronic device or by a vehicle subsystem. In the depicted example, the corresponding data 420 for a distracting condition indicates whether the user is conducting a voice conversation on their mobile device. A 'high' level, or 'bump upward' in the data 420 indicates that a voice conversation is present at the corresponding position along the route segment 320 while a 'low' level in the data 420 indicates that a voice conversation is not present at the corresponding position along the route segment 320.

In the depicted embodiment, distraction-present intervals are determined by enlarging the interval where the voice conversation is present with a setup time 430 and a hang-up time 440. The use of a setup time and a hang-up time recognizes that distraction for the user may be longer than interval indicated by the distraction condition data 420. The distraction-free intervals are determined to be all other intervals. In the depicted example intervals I2,I5, I8 and I11 are distraction-present intervals while intervals I1, I3-I4, I6-I7, I9-I10 and I12 are distraction-free intervals. In the depicted example, the distraction-present intervals average about 28 percent of the traveled distance but correspond to four sharp lateral movement events 450 compared with two for the distraction-free intervals. Consequently, the effect of the distraction condition is a rate of potentially dangerous driving events that is approximately 7 times greater for distraction-present intervals compared to distraction-free intervals. While the depicted example is merely illustrative, it serves to demonstrate that factual data on the effect of a distracting condition can be determined for a driver. The factual data may be presented to a reviewer, such as the driver, to facilitate improvements in driving safety that have not been obtained with conventional laws and warnings.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
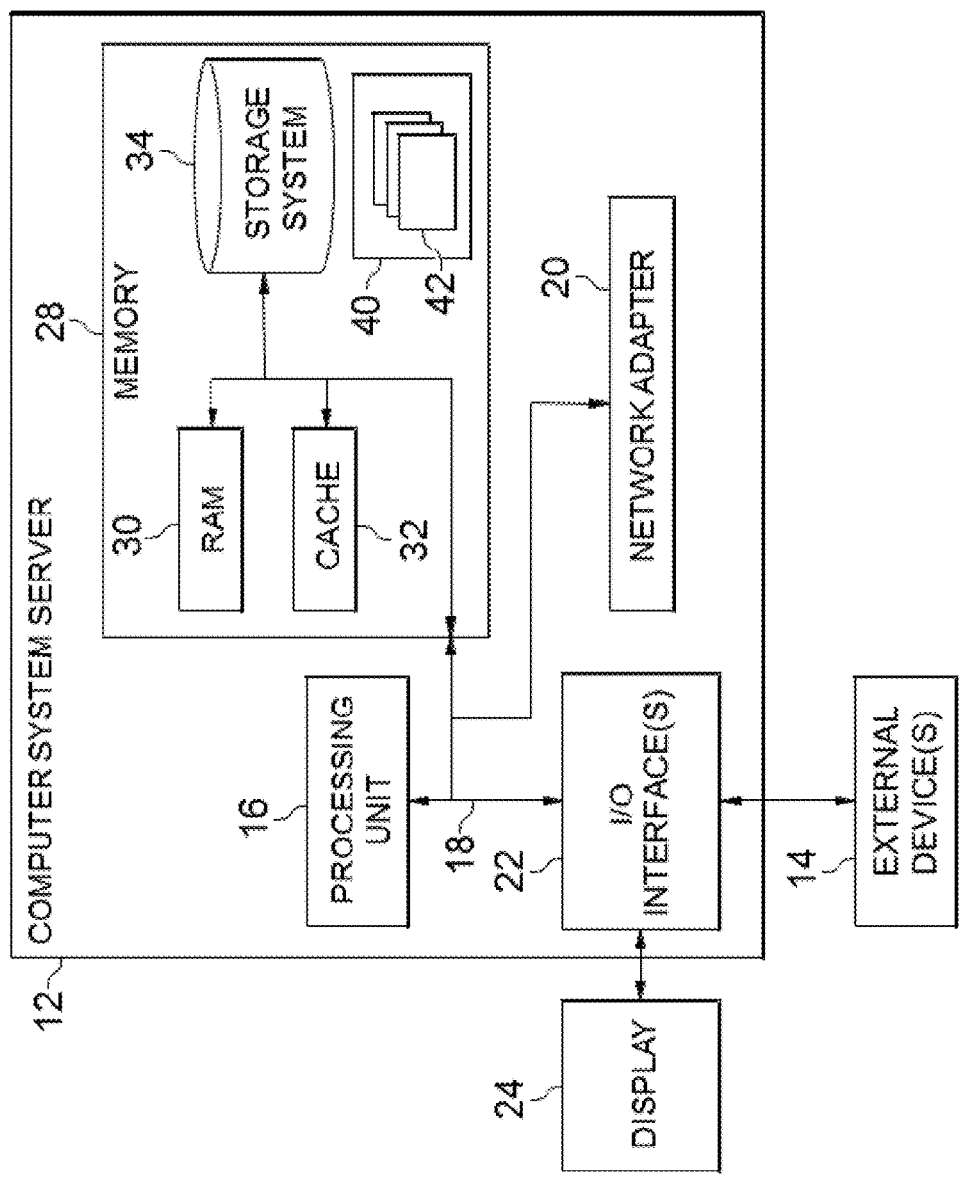
FIG. 5 is a block diagram depicting one example of a computing apparatus (e.g., cloud computing node) suitable for executing the methods disclosed herein.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
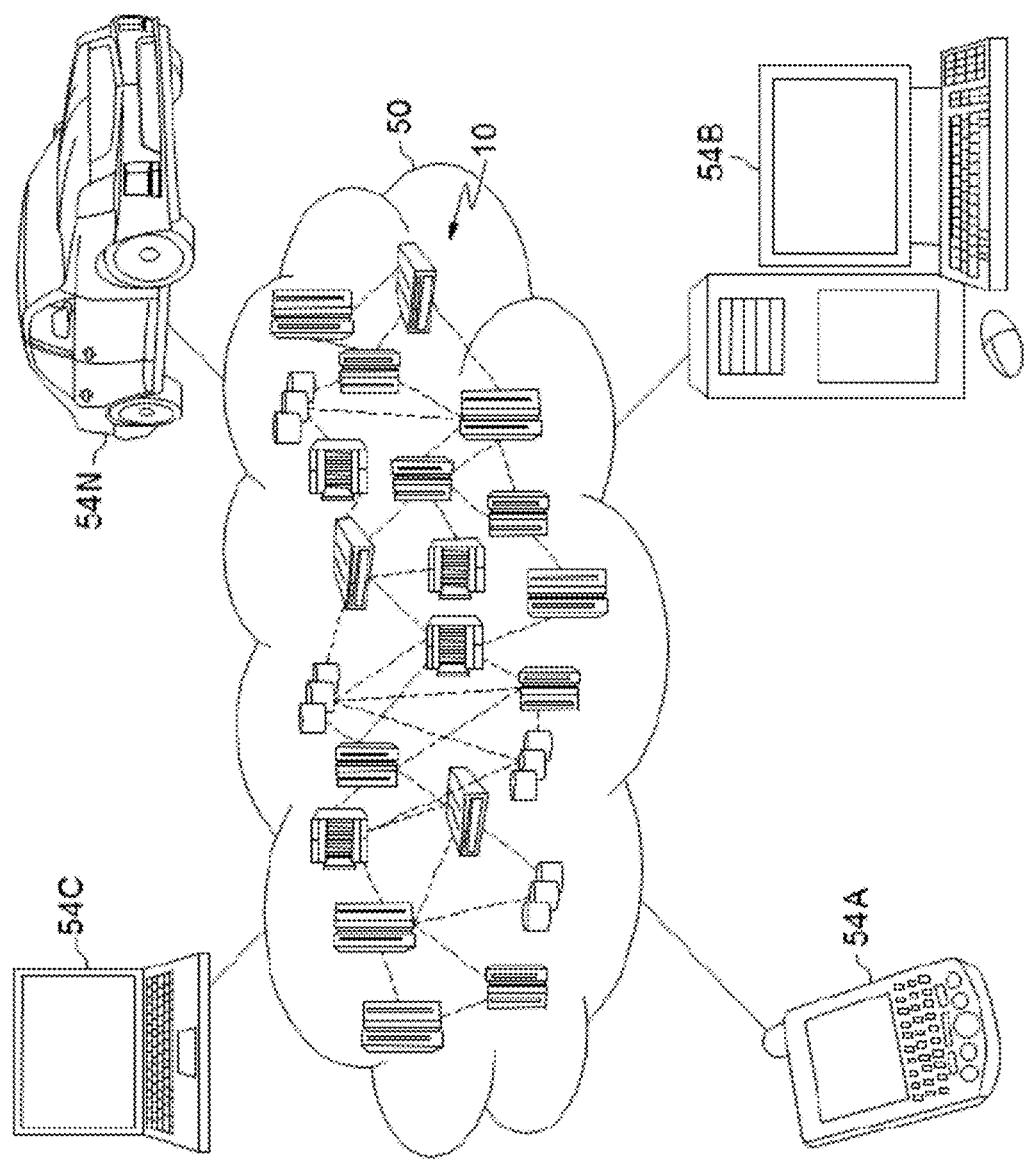
FIG. 6 depicts a cloud computing environment in accordance with to at least one embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
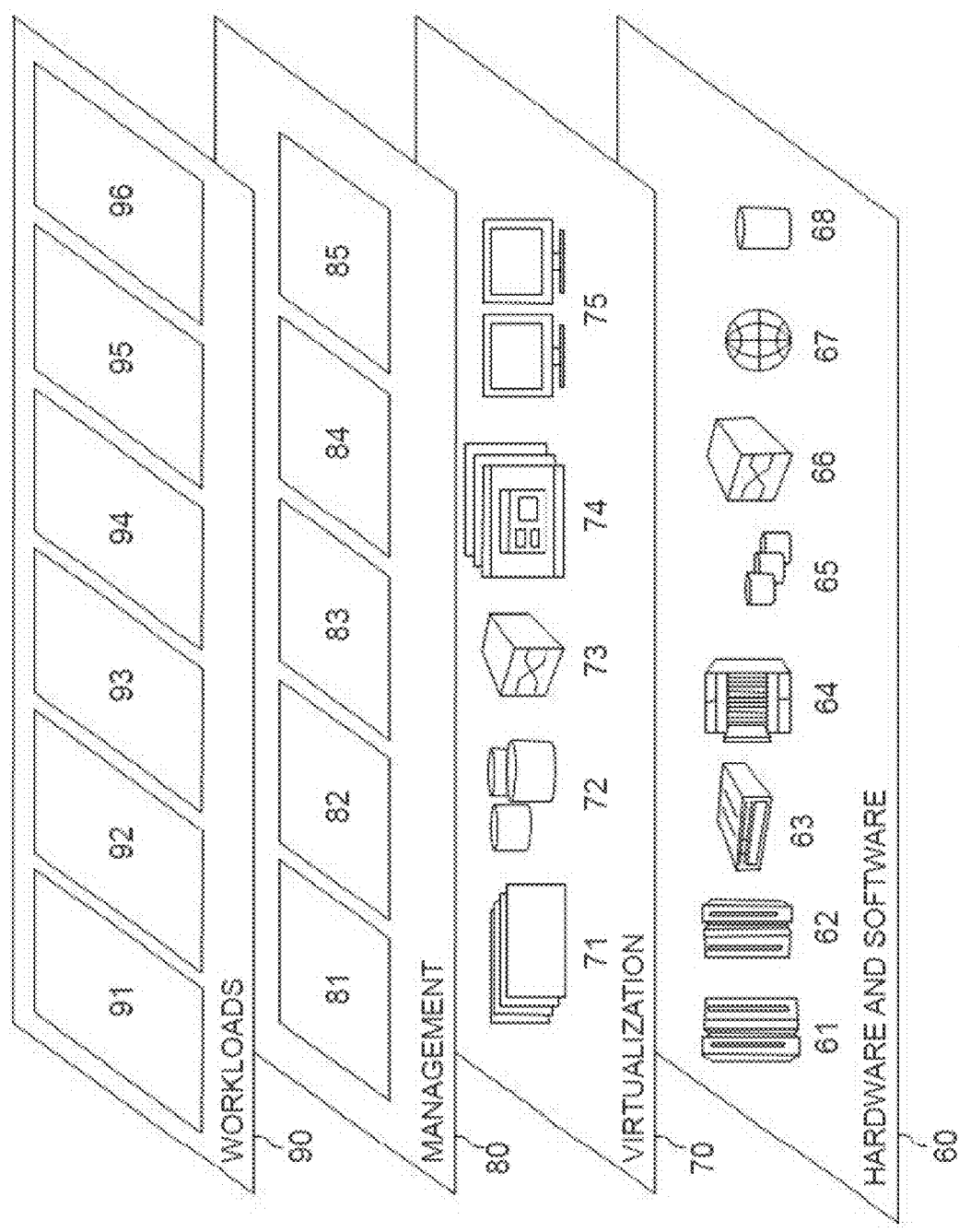
FIG. 7 depicts abstraction model layers in accordance with at least one embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, executed by one or more processors, the method comprising:
    receiving movement data and distracting conditions data corresponding to one or more driving sessions for a user;
    identifying a potentially distracting condition for the user encountered during the one or more driving sessions;
    determining one or more distraction-free travel intervals for the one or more driving sessions where the potentially distracting condition does not occur;
    determining one or more distraction-present travel intervals for the one or more driving sessions where the potentially distracting condition does occur; and
    comparing movement data corresponding to the one or more distraction-free travel intervals with movement data corresponding to the one or more distraction-present travel intervals to produce distraction effect information, wherein the movement data comprises rotational data provided by a sensor mounted on a steering component of a device operated by the user, wherein the movement data is collected from the sensor that is proximate to or within the device during the one or more driving sessions, wherein the movement data is filtered to determine an amount of lateral movement and forward braking that occurs during the one or more driving sessions, wherein a threshold is selected based on the lateral movement and forward braking to identify sharp lateral movements and sudden brakes during the one or more driving sessions, and wherein lateral movement and forward braking that exceed the selected threshold are marked and compared to produce the distraction effect information;
    wherein determining each of the one or more distraction-present travel intervals includes determining a starting location or time and an ending location or time for the potentially distracting condition.

2. The method of claim 1, wherein the one or more driving sessions include multiple sessions over an identical route.

3. The method of claim 2, wherein the one or more distraction-free travel intervals and the one or more distraction-present travel intervals occur over the identical route.

4. The method of claim 2, wherein the multiple sessions occur during a similar time of day.

5. The method of claim 2, wherein the multiple sessions occur during similar traffic conditions.

6. The method of claim 2, wherein the multiple sessions occur during similar environmental conditions.

7. The method of claim 2, wherein the identical route is a habitually selected route.

8. The method of claim 1, wherein the potentially distracting condition comprises a conversation.

9. The method of claim 8, wherein the conversation includes a remote party.

10. The method of claim 8, wherein the conversation includes a passenger.

11. The method of claim 1, wherein the potentially distracting condition comprises using an electronic device.

12. The method of claim 1, further comprising enlarging at least one of the distraction-present intervals to include a selected interval immediately previous to the starting time or location, or a selected interval immediately after the ending time or location.

13. A computer system comprising:
    one or more computer processors;
    one or more computer readable storage media and program instructions stored on the one or more computer readable storage media, the program instructions comprising instructions to perform:
    receiving movement data and distracting conditions data corresponding to one or more driving sessions for a user;
    identifying a potentially distracting condition for the user encountered during the one or more driving sessions;
    determining one or more distraction-free travel intervals for the one or more driving sessions where the potentially distracting condition does not occur;
    determining one or more distraction-present travel intervals for the one or more driving sessions where the potentially distracting condition does occur; and
    comparing movement data corresponding to the one or more distraction-free travel intervals with movement data corresponding to the one or more distraction-present travel intervals to produce distraction effect information, wherein the movement data comprises rotational data provided by a sensor mounted on a steering component of a device operated by the user, wherein the movement data is collected from the sensor that is proximate to or within the device during the one or more driving sessions, wherein the movement data is filtered to determine an amount of lateral movement and forward braking that occurs during the one or more driving sessions, wherein a threshold is selected based on the lateral movement and forward braking to identify sharp lateral movements and sudden brakes during the one or more driving sessions, and wherein lateral movement and forward braking that exceed the selected threshold are marked and compared to produce the distraction effect information;
    wherein determining each of the one or more distraction-present travel intervals includes determining a starting location or time and an ending location or time for the potentially distracting condition.

14. The computer system of claim 13, wherein the one or more driving sessions include multiple sessions over an identical route.

15. The computer system of claim 14, wherein the one or more distraction-free travel intervals and the one or more distraction-present travel intervals occur over the identical route.

16. The computer system of claim 14, wherein the multiple sessions occur during a similar time of day.

17. The computer system of claim 14, wherein the multiple sessions occur during similar traffic conditions.

18. The computer system of claim 14, wherein the multiple sessions occur during similar environmental conditions.

19. The computer system of claim 13, further comprising enlarging at least one of the distraction-present intervals to include a selected interval immediately previous to the starting time or location, or a selected interval immediately after the ending time or location.

20. A computer program product comprising:
one or more computer readable storage media and program instructions stored on the one or more computer readable storage media, the program instructions comprising instructions to perform:
receiving movement data and distracting conditions data corresponding to one or more driving sessions for a user;
identifying a potentially distracting condition for the user encountered during the one or more driving sessions;
determining one or more distraction-free travel intervals for the one or more driving sessions where the potentially distracting condition does not occur;
determining one or more distraction-present travel intervals for the one or more driving sessions where the potentially distracting condition does occur; and
comparing movement data corresponding to the one or more distraction-free travel intervals with movement data corresponding to the one or more distraction-present travel intervals to produce distraction effect information, wherein the movement data comprises rotational data provided by a sensor mounted on a steering component of a device operated by the user, wherein the movement data is collected from the sensor that is proximate to or within the device during the one or more driving sessions, wherein the movement data is filtered to determine an amount of lateral movement and forward braking that occurs during the one or more driving sessions, wherein a threshold is selected based on the lateral movement and forward braking to identify sharp lateral movements and sudden brakes during the one or more driving sessions, and wherein lateral movement and forward braking that exceed the selected threshold are marked and compared to produce the distraction effect information;
wherein determining each of the one or more distraction-present travel intervals includes determining a starting location or time and an ending location or time for the potentially distracting condition.

* * * * *